3,369,216
SYSTEM FOR REDUCING THE TRANSMISSION OF NOISE IN MARINE SEISMIC SURVEYING
George B. Loper, Duncanville, Tex., assignor to Mobil Oil Corporation, a corporation of New York
Continuation of application Ser. No. 325,700, Nov. 22, 1963. This application July 28, 1966, Ser. No. 568,541
4 Claims. (Cl. 340—7)

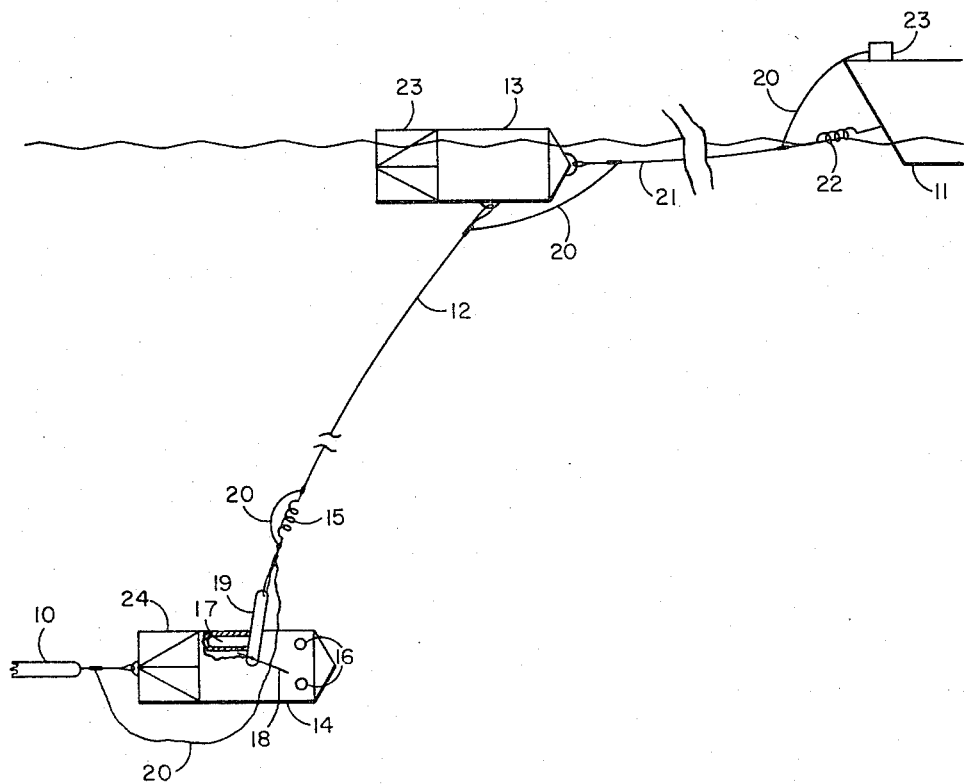
Feb. 13, 1968     G. B. LOPER     3,369,216
SYSTEM FOR REDUCING THE TRANSMISSION OF
NOISE IN MARINE SEISMIC SURVEYING
Original Filed Nov. 22, 1963
GEORGE B. LOPER
INVENTOR
BY *Arthur F Zobal*

ABSTRACT OF THE DISCLOSURE

A marine seismic towing system including a tow vessel, a seismic detecting system coupled to the tow vessel by a cable arrangement, and a float for maintaining the detecting system at a desired depth in water and above the bottom. The detecting system is employed to detect seismic signals while being towed in the water. The effect of mechanical noise upon the response of the detecting system and due to the towing operation is reduced by employing an inertia member coupled to the detecting system and resilient means coupled to the cable.

---

This application is a continuation of application Ser. No. 325,700, filed November 22, 1963, and now abandoned.

The invention relates to marine seismic surveying and more particularly to a system for improving the response of seismic signal detectors while being towed in water and has for an object the provision of a towing system having a natural mechanical frequency much less than the seismic frequency band and including a member of high inertia for isolating seismic detectors from unwanted noise resulting from the towing operations.

In present day marine seismic surveying, continuous seismograms are produced by repetitively producing seismic disturbances in water from a moving vessel at short time periods, for example, every six seconds. To carry out these operations, detectors of a seismic spread towed behind the vessel continuously detect reflected signals during the towing operations. In conventional towing systems, the spread is supported below the surface at a desired depth by a cable which is fixedly and directly coupled to the front end of the spread and to a suitable float towed behind the tow vessel. The difficulty with such a system is that mechanical noise, created by movement of the float and the cable, is transmitted by way of the cable directly to the seismic spread. This noise seriously affects the response of the detecting system since it has frequency components thereof in the seismic frequency band.

In accordance with the present invention, there is provided a system for isolating the detecting system from the unwanted noise occurring as the result of the towing operation. More particularly, the system comprises a member of high inertia pivotally coupled to a seismic detecting means to be supported below the surface of water. A towline coupled to the high inertia member leads to a tow vessel. In addition, means is provided for maintaining the high inertia member at a desired depth. The towline includes means for maintaining the natural frequency of the combination including the detecting means, the high inertia member, and the towline at a value much lower than the seismic frequency band, thereby reducing the transmission of unwanted noise in the seismic frequency band, and above, from the towline to the detecting means. More particularly, the natural frequency of the system is maintained at a value much less than 10 cycles per second and may be of the order of one cycle per second.

In a more specific aspect, the system comprises a buoyant supporting member to be towed at the surface of water. A hollow container is supported below the surface of water at a desired depth by a towline extending from the buoyant member. Means is provided for pivotally coupling the container to the seismic detecting means. The container has at least one aperture formed through the wall structure thereof for allowing water to enter the container when in water and to be trapped therein while being towed. The container, including the water trapped therein, has high inertia and isolates the detecting means from the towline thereby reducing the transmission of noise from the towline to the detecting system. The aperture additionally allows water to pass out of the container when taken out of the water, thus allowing ease of handling. The combination of the container, the towline, and the detecting means has a natural frequency much lower than the seismic frequency band. More particularly, the towline includes a resilient means for maintaining the natural frequency at the desired low value.

For further objects and advantages of the invention and for a more complete description thereof, reference may now be had to the following description taken in conjunction with the accompanying drawing which illustrates the system of the present invention.

More particularly, the figure discloses a seismic detecting means 10 being towed behind a tow vessel 11 and supported below the surface by a cable 12 extending from a float 13. In accordance with the present invention, there is provided a system for isolating the detecting system 10 from the cable 12 thereby reducing the transmission of noise from the cable 12 to the detecting means 10. More particularly, the isolating system comprises a depressor 14 of high inertia pivotally coupled to cable 12 and a resilient member 15. The depressor is a hollow container relatively light in weight when empty and having apertures 16 leading to the interior thereof for allowing water automatically to fill the container when immersed in water. The apertures preferably are positioned in the front of the container and are of a relatively small diameter, thus allowing water to be trapped in the container while it is being towed. The system of the present invention utilizes the mass of the water trapped in the container and of the container itself for isolating the detecting system from noise. More particularly, the depressor may weigh 35–60 pounds when empty. In air, when filled with water, the depressor may have a weight of the order of 200 pounds. Thus, the depressor, including the water trapped therein, has inertia equivalent to that of a 200-pound weight which filters and absorbs noise produced by the cable 12 and the float 13 thereby isolating the detecting means 10 from the towing system. When removed from water, the depressor is easily handled since water drains through apertures 16 leaving a light-weight container.

The resilient means 15, which may be a spring or a resilient shock cord, is provided to further improve the response of the detecting means 10. More particularly, resilient member 15 is employed to maintain the natural mechanical frequency of the combination including the cable 12, resilient member 15, the depressor 14, and the detecting means 10 at a value much lower than the seismic frequency band which is of the order of 10–80 cycles per second. This is done in order to reduce the transmission of mechanical noise in the seismic frequency band and above to the detecting system. More particularly, according to the principles of vibration isolation, the transmission of a disturbing frequency is a function of the ratio between the disturbing frequency and the natural frequency. If the system has a relatively low natural frequency, the transmission of the disturbing frequency (in seismic operations, noise at a frequency above about 10 cycles per second) will be greatly reduced.

Thus, in accordance with the present invention, mechanical noise in the seismic frequency band and above is filtered to improve the response of the seismic detectors. In the system disclosed, electronic means may be employed at the recording system or at the laboratory to filter noise below the seismic frequency band.

An example now will be given of the characteristics of a resilient member 15 necessary to maintain the natural frequency of the combination including the cable 12, the container 14, and the detecting system 10 at a desirable low value, for example, one cycle per second. The expression for the natural frequency is given by the following equation:

$$F = \frac{1}{2\pi}\sqrt{\frac{k}{m}} \quad (1)$$

where:
F is the natural frequency;
$k$ is the stiffness factor, being a constant having units of pounds per foot; and
$m$ is the mass equal to pounds of weight divided by the acceleration due to gravity (32 feet/sec.$^2$).

If the effective weight of the cable 12, the container, and the detecting system were 300 pounds and a natural frequency of one cycle per second were desired, then from equation (1) $k$ would be equal to about 370 pounds per foot. Thus, not considering the compliance of the cable since it is relatively insignificant, one can use a spring or shock cord 15 having a stiffness factor of about 370 pounds per foot in order to obtain a natural frequency of the system of one cycle per second.

Referring to other components of the system, the depressor 14 is provided with an air compartment 17 to make the depressor 14 neutrally buoyant. Vanes 18 are employed to provide a negative lift. The towing depth of depressor 14 and hence of detecting system 10 may be of the order of 25 feet below the surface with the depressor positioned about 50 feet back of the float, the depth and position being determined by the length of the cable 12, the speed of the vessel 11, and the amount of negative lift afforded by vanes 18. The cable is pivotally coupled to depressor 14 by a swivel 19. The swivel pivotal axis approximately passes through the center of gravity. The detector signals are applied to a recording system 23 on the tow vessel 11 by way of conductor 20 which passes to the recording system along with cable 12 and cable 21 coupled from the float to the vessel 11. The cables 12 and 21 may be plastic-covered, braided-steel wire rope ¼″ to ⅜″ diameter. A resilient member 22, which may be a spring or elastic shock cord, also is provided to reduce noise. The detecting system 10 is a conventional system comprising a plurality of detectors seated in a casing which is neutrally buoyant. In addition, fins 24a and 24 are provided respectively on the float and depressor to stabilize the members during towing operations.

While the invention has been described in connection with a specific embodiment thereof, it will be understood now that further modifications will suggest themselves to those skilled in the art and it is intended to cover such modifications as fall within the scope of the appended claims.

What is claimed is:

1. A marine seismic surveying system comprising:
a detecting system for detecting seismic signals in a body of water and reflected from subsurface formations following the generation of exploratory acoustic pulses,
a tow vessel,
cable means for coupling said detecting system to said tow vessel,
buoyant means for maintaining said detecting system and cable means above the bottom of said body of water,
said tow vessel continuously towing said detecting system in water over a predetermined distance,
said detecting system detecting seismic signals while being towed, and
resilient means having a first end coupled to said cable means at a desired position adjacent said tow vessel and a second end coupled to said tow vessel for reducing the effect of noise on said detecting system and resulting from said towing operation.

2. A marine seismic surveying system comprising:
a detecting system for detecting seismic signals in a body of water and reflected from subsurface formations following the generation in water of acoustic pulses by an acoustic source,
said detecting system including an elongated casing having a plurality of detectors located therein,
means for continuously towing said detecting system in water below the surface thereof and above the bottom of said body of water for detecting seismic signals while being towed,
said last-named means comprising a tow vessel and cable means coupled to said detecting system and to said tow vessel, and
resilient means comprising an elongated member having a first end coupled to said cable means at a desired position and a second end coupled to said tow vessel for reducing the effect of said towing operation on the response of said detecting system.

3. A marine seismic surveying system comprising:
a detecting system for detecting seismic signals in a body of water and reflected from subsurface formations following the generation of exploratory acoustic pulses,
means including float means for maintaining said detector system in water at a predetermined depth and above the bottom of said body of water,
a tow vessel for continuously towing said detecting system in water over a predetermined distance,
cable means for coupling said detecting system to said tow vessel,
said detecting system detecting seismic signals while being towed, and
resilient means comprising an elongated member having a first end coupled to said cable means at a desired position and a second end coupled to said tow vessel for reducing the effect of said towing operation on the response of said detecting system,
said elongated member having a length relative to the length of the portion of said cable means between said desired position and said tow vessel such that said resilient means is maintained under tension during towing operations.

4. A marine seismic surveying system comprising:
a detecting system for detecting seismic signals in a body of water and reflected from subsurface formations following the generation in water of acoustic pulses by an acoustic source,
said detecting system including an elongated casing having a plurality of detectors located therein,
means for continuously towing said detecting system in water below the surface thereof and above the bottom of said body of water for detecting seismic signals while being towed,
said last-named means comprising a tow vessel and cable means coupled to said detecting system and to said tow vessel,
a first resilient means coupled to said cable means adjacent said detecting system between said detecting system and said tow vessel,
a second resilient means coupled to said cable means adjacent said tow vessel,
said second resilient means comprising an elongated member having a first end coupled to said cable means at a desired position spaced relatively close to said tow vessel and a second end coupled to said tow vessel.

References Cited

UNITED STATES PATENTS

| 1,378,960 | 5/1921 | Horton | 340—7 |
| 2,465,696 | 3/1949 | Paslay | 181—.5 |
| 2,478,517 | 8/1949 | Winterhalter | 340—7 |
| 2,544,819 | 9/1952 | Babb et al. | 340—7 |
| 2,241,428 | 5/1941 | Silverman | 340—7 |
| 3,290,645 | 12/1966 | Pavey et al. | 340—7 |

BENJAMIN A. BORCHELT, *Primary Examiner.*

P. A. SHANLEY, *Assistant Examiner.*

Disclaimer 3,369,216.—*George B. Loper*, Duncanville, Tex. SYSTEM FOR REDUCING THE TRANSMISSION OF NOISE IN MARINE SEISMIC SURVEYING. Patent dated Feb. 13, 1968. Disclaimer filed May 8, 1968, by the assignee, *Mobil Oil Corporation*.

Hereby enters this disclaimer to claims 1 to 4 and the entire term of said patent.

[*Official Gazette June 11, 1968.*]